(12) United States Patent
Kong et al.

(10) Patent No.: US 6,496,800 B1
(45) Date of Patent: Dec. 17, 2002

(54) SPEAKER VERIFICATION SYSTEM AND METHOD USING SPOKEN CONTINUOUS, RANDOM LENGTH DIGIT STRING

(75) Inventors: Byung-goo Kong, Seongnam (KR); Sang-ryong Kim, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/562,889

(22) Filed: May 1, 2000

(30) Foreign Application Priority Data

Jul. 7, 1999 (KR) .............................. 99-27247

(51) Int. Cl.[7] .............................................. G10L 17/00
(52) U.S. Cl. ........................ 704/239; 704/243; 704/246
(58) Field of Search ................................ 704/239, 237, 704/238, 240, 236, 243, 246; 379/88

(56) References Cited

U.S. PATENT DOCUMENTS 5,517,558 A * 5/1996 Schalk ......................... 379/88
5,548,110 A * 8/1996 Storch et al. ............... 235/472

* cited by examiner

Primary Examiner—Susan McFadden
(74) Attorney, Agent, or Firm—Burns, Doane, Swecker & Mathis, LLP

(57) ABSTRACT

A speaker verification system using the voice of a user uttering a continuous, random length digit string is provided. The speaker verification system includes a random digit generator for generating a continuous, random length digit string; a user interface for providing the continuous, random length digit string; a feature extractor for extracting voice features from the user's voice uttering the continuous, random length digit string; a digit voice verification unit for comparing the voice features with items in a speaker-independent continuous digit voice model to derive a digit string corresponding to items in the speaker-independent continuous digit voice model, which match the voice features, and for determining whether the derived digit string is identical to the digit string provided to the user via the user interface; and a speaker verification unit for comparing the voice features with a speaker-dependent model of the user to measure the similarity between them. The speaker-dependent model of the user includes previously determined features of the users' voice and determines whether to approve or reject the user based on the similarity.

15 Claims, 5 Drawing Sheets

SPEAKER VERIFICATION SYSTEM AND METHOD USING SPOKEN CONTINUOUS, RANDOM LENGTH DIGIT STRING

This application is based on Korean Patent Application No. 99-27247 filed on Jul. 7, 1999, herein incorporated by reference.

BACKGROUND OF THE INVENTION

1. Field of the Invention

The present invention relates to a speaker verification system using voice, and more particularly, to a speaker verification system using the voice of a user uttering a continuous, random length digit string.

2. Description of the Related Art

Security verification of users requesting access to particular service is required in various application fields. For example, it is necessary to confirm whether users requesting access to services, such as a banking service, a credit card inquiry service and electronic commerce, have authority to use the service. A representative method of user verification is a method of using passwords or personal identification numbers (PINs). The method of using passwords has a disadvantage in that users must accurately memorize the passwords. Users tend to use passwords which are easy to remember for the convenience of memorization. Therefore, the passwords can be easily deduced and misappropriated.

To overcome the above problems, interest in biotechnological security techniques, that is, techniques of identifying individual persons based on personal biotechnological features, has increased. As a representative method, there is a method of identifying users based on users' voices. The method of identifying users based on personal voice features is more advantageous in terms of price or implementation than other methods, for example, a method of identifying users based on finger prints. By using the method of identifying users based on voice for security verification in electronic commerce through a telephone network or the internet, users can be immediately identified based on their voice without a disadvantage such as memorization of a password. In addition, control of access to sites employing security systems can be made very easy by using voice verification technology. The method of identifying users through voice performs voice verification by comparing various voice parameters of particular voices. The parameters include pitch cycle, voice intensity and other acoustic features.

However, conventional voice verification systems employ a text-dependent method, that is, a method of using a previously memorized reference script and requiring a user to speak the reference script. Since a text, which is to be spoken by a user, is fixed, misappropriation of voice can easily happen by recording the user's voice speaking the text. Moreover, in a text-independent method for overcoming the problems of the text-dependent method, management of a huge database for storing various voice features slows down processing speed.

SUMMARY OF THE INVENTION

To solve the above problems, it is a first objective of the present invention to provide a speaker verification system and method using the voice of a user uttering a continuous, random length digit string, wherein a simple digit string is used so as to improve processing speed, randomness is increased so as to remove the possibility of voice misappropriation, and a mechanical sound determination mechanism is provided, and a computer-readable medium storing a program for the system and method.

It is a second objective of the present invention to provide a speaker registration method which is implemented in the above speaker verification system and a computer-readable medium storing a program for the speaker registration method.

Accordingly, to achieve one aspect of the first objective, there is provided a speaker verification system using the voice of a user uttering a continuous, random length digit string. The speaker verification system includes a random digit generator for generating a continuous, random length digit string; a user interface for providing the continuous, random length digit string, which is generated by the random digit generator, to the user and receiving the voice of the user uttering the provided continuous, random length digit string; a feature extractor for extracting voice features from the user's voice which is received via the user interface; a digit voice verification unit for comparing the voice features, which are extracted by the feature extractor, with items in a speaker-independent continuous digit voice model to derive a digit string corresponding to items in the speaker-independent continuous digit voice model, which match the voice features, and for determining whether the derived digit string is identical to the digit string, which has been provided to the user via the user interface; and a speaker verification unit for comparing the voice features, which are extracted by the feature extractor, with a speaker-dependent model of the user to measure the similarity between them, the speaker-dependent model of the user including previously determined features of the users' voice, and for determining whether to approve or reject the user based on the similarity, when it is determined that the derived digit string is identical to the digit string which has been provided to the user.

In another aspect of the present invention, there is provided a speaker verification method using the voice of a user uttering a continuous, random length digit string. The speaker verification method includes the steps of (a) randomly generating a continuous, random length digit string; (b) providing the continuous, random length digit string to the user; (c) receiving the voice of the user uttering the continuous, random length digit string; (d) extracting voice features from the received user's voice; (e) comparing the extracted voice features with items in a speaker-independent continuous digit voice model to derive a digit string corresponding to items in the speaker-independent continuous digit voice model, which match the voice features, and determining whether the derived digit string is identical to the digit string provided to the user in the step (b); and (f) comparing the voice features extracted in the step (d), with a speaker-dependent model of the user and determining whether to approve or reject the user.

In yet another aspect of the present invention, there is provided a speaker verification method using the voice of a user uttering a continuous, random length digit string. The speaker verification method includes the steps of (a) providing a continuous, random length digit string, which is randomly generated, to a user; (b) receiving the voice of the user uttering the continuous, random length digit string and extracting voice features from the received user's voice; (c) comparing the extracted voice features with items in a speaker-independent continuous digit voice model to derive a digit string corresponding to items in the speaker-independent continuous digit voice model, which are matched with the voice features, and determining whether the derived digit string is identical to the digit string, which has been provided to the user in the step (a); (d) comparing the voice features, which has been extracted in the step (c), with speaker model of the user and measuring the similarity between the voice features and the speaker model of the user, the similarity indicating the difference between phonetic values; (e) increasing a first speaker rejection count when the similarity, which is measured in the step (d), is greater than or equal to a predetermined lower similarity threshold and increasing a second speaker rejection count when the similarity is greater than or equal to a predetermined upper similarity threshold; and (f) after repeating the steps (a) through (e) a plurality of times, (f1) approving the user when the first speaker rejection count is 0, and rejecting the user when the second speaker rejection count is at least 1 or the first speaker rejection count exceeds a predetermined rejection count threshold; and (f2) determining whether to approve or reject the user based on the similarity measured in the step (d), when the second speaker rejection count is 0, and the first speaker rejection count is at least 1 and less than or equal to the rejection count threshold.

In still yet another aspect of the present invention, there is provided a computer-readable recording medium for recording a program which is executed in a computer for speaker verification for verifying a user by their voice when uttering a continuous, random length digit string. The program includes the steps of (a) randomly generating a continuous, random length digit string; (b) providing the continuous, random length digit string to the user; (c) receiving the voice of the user uttering the continuous, random length digit string; (d) extracting voice features from the received user's voice; (e) comparing the extracted voice features with items in a speaker-independent continuous digit voice model to derive a digit string corresponding to items in the speaker-independent continuous digit voice model, which match the voice features, and determining whether the derived digit string is identical to the digit string provided to the user in the step (b); and (f) comparing the voice features extracted in the step (d), with a speaker-dependent model of the user and determining whether to approve or reject the user.

In further another aspect of the present invention, there is provided a computer-readable recording medium for recording a program which is executed in a computer for speaker verification for verifying a user by the voice of the user uttering continuous, random length digit string. The program includes the steps of (a) providing a continuous, random length digit string, which is randomly generated, to a user; (b) receiving the voice of the user uttering the continuous, random length digit string and extracting voice features from the received user's voice; (c) comparing the extracted voice features with items in a speaker-independent continuous digit voice model to derive a digit string corresponding to items in the speaker-independent continuous digit voice model, which are matched with the voice features, and determining whether the derived digit string is identical to the digit string, which has been provided to the user in the step (a); (d) comparing the voice features, which has been extracted in the step (c), with speaker model of the user and measuring the similarity between the voice features and the speaker model of the user, the similarity indicating the difference between phonetic values; (e) increasing a first speaker rejection count when the similarity, which is measured in the step (d), is greater than or equal to a predetermined lower similarity threshold and increasing a second speaker rejection count when the similarity is greater than or equal to a predetermined upper similarity threshold; and (f) after repeating the steps (a) through (e) a plurality of times, (f1) approving the user when the first speaker rejection count is 0, and rejecting the user when the second speaker rejection count is at least 1 or the first speaker rejection count exceeds a predetermined rejection count threshold; and (f2) determining whether to approve or reject the user based on the similarity measured in the step (d), when the second speaker rejection count is 0, and the first speaker rejection count is at least 1 and less than or equal to the rejection count threshold.

To achieve the second objective, there is also provided a speaker registration method in the speaker verification system according to the embodiment of the present invention. The speaker registration method includes the steps of (a) providing a continuous digit string having various phonetic values to a user; (b) receiving the voice of the user uttering the continuous digit string; (c) extracting voice features from the received user's voice; (d) comparing the extracted voice features with items in a speaker-independent continuous digit voice model to derive a digit string corresponding to items in the speaker-independent continuous digit voice model, which match the voice features, and determining whether the derived digit string is identical to the digit string provided to the user in the step (a); (e) comparing the voice features extracted in the step (c), with speaker-dependent model of the user and measuring the similarity between the voice features and the speaker dependent model of the user; and (f) determining whether to register the user based on the measured similarity.

In another aspect of the present invention, there is provided a computer-readable recording medium for recording a program which is executed in a computer for speaker registration in a speaker verification system. The program includes the steps of (a) providing a continuous digit string having various phonetic values to a user; (b) receiving the voice of the user uttering the continuous digit string; (c) extracting voice features from the received user's voice; (d) comparing the extracted voice features with items in a speaker-independent continuous digit voice model to derive a digit string corresponding to items in the speaker-independent continuous digit voice model, which match the voice features, and determining whether the derived digit string is identical to the digit string provided to the user in the step (a); (e) comparing the voice features extracted in the step (c), with speaker-dependent model of the user and measuring the similarity between the voice features and the speaker dependent model of the user; and (f) determining whether to register the user based on the measured similarity.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

A speaker verification system is representatively applied to a credit card inquiry service, banking service and electronic commerce market over a telephone network or the internet, and security inspection service for access to particular sites. As well as those applications described above, the present invention can be applied to any application fields which can perform security inspection of users based on their voice.

Figure 1:
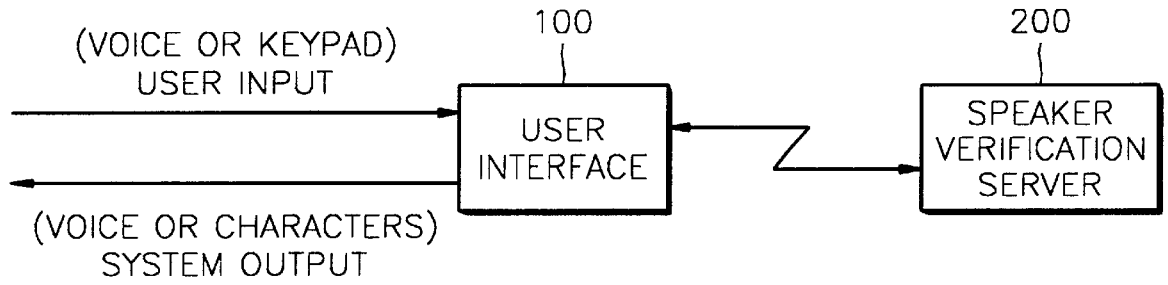
FIG. 1 is a block diagram for schematically showing the overall structure of a speaker verification system according to an embodiment of the present invention.

As shown in FIG. 1, a speaker verification system according to an embodiment of the present invention, largely includes a user interface 100 and a speaker verification server 200. The user interface 100 provides an interface between a user, who requests access to a particular service, and a server, which performs security inspection of service access rights. In the embodiment of the present invention, the user interface 100 is provided with a means for receiving the voice of a user. In addition to this, the user can perform input of particular keys on a keypad or touch screen and the system can output voice or characters. Accordingly, the user interface 100 may additionally be provided with an input unit such as a keypad or a touch screen and an output unit such as a display or a speaker if necessary.

Figure 2:
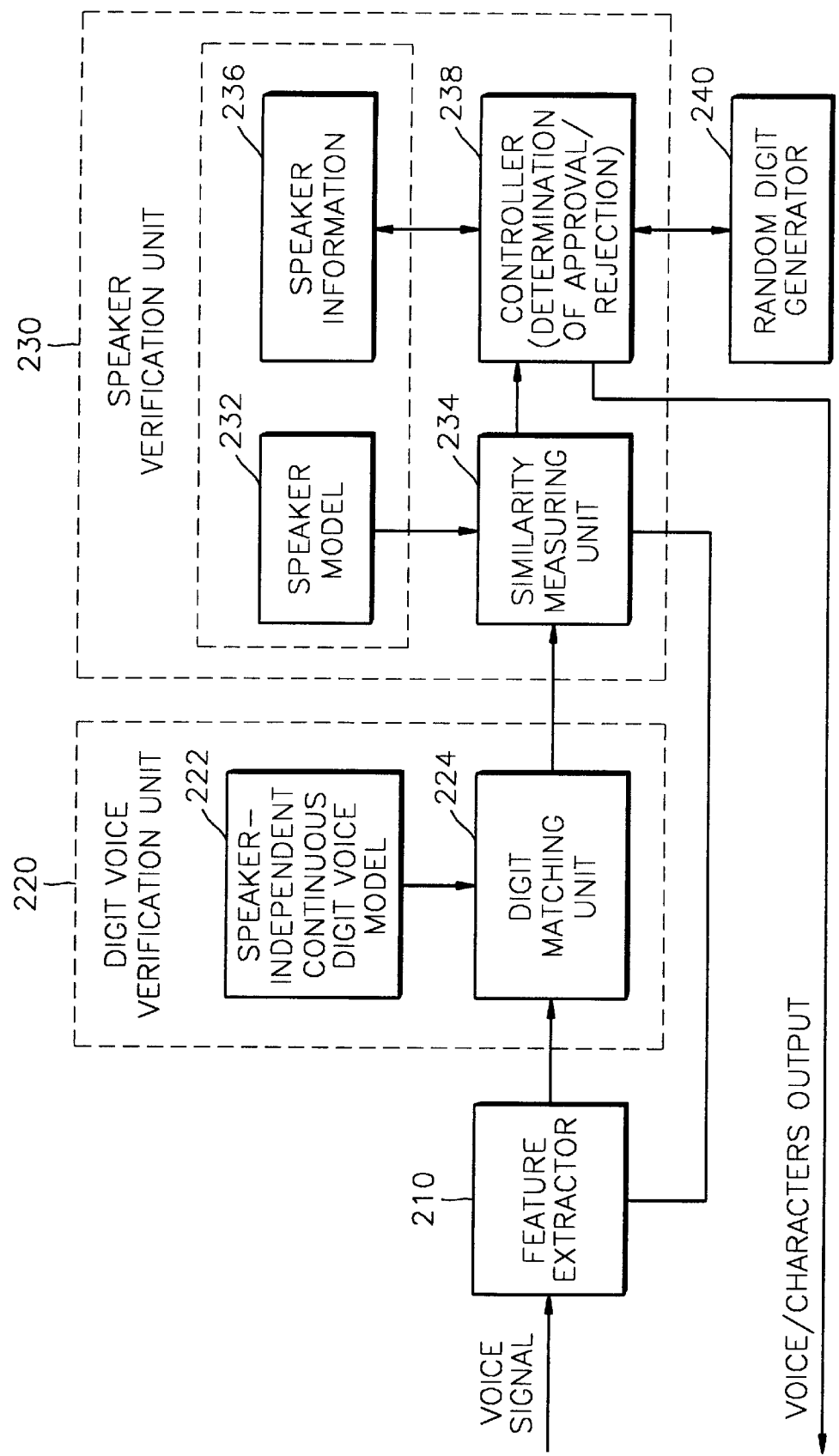
FIG. 2 is a detailed block diagram of the speaker verification server of FIG. 1 focusing on a voice input/output process according to the embodiment of the present invention.

FIG. 2 is a detailed block diagram of the speaker verification server 200 of FIG. 1 focusing on a voice input/output process according to the embodiment of the present invention. As shown in FIG. 2, the speaker verification server 200 includes a feature extractor 210 for extracting voice features from a user's voice input, a digit voice verification unit 220 for determining whether input voice signals match digits requested by the system, a speaker verification unit 230 for comparing the voice features extracted by the feature extractor 210 with a designated speaker model and determining approval or rejection of a speaker through a speaker authentication procedure, and a random digit generator 240 for generating continuous, random length digit strings.

Once a user requests service by inputting a user ID through voice or a keypad input unit, the system starts a user authentication procedure. In another case, once a user requests service, the system requests the user to input a user ID and then the user inputs the user ID. Here, description is focused on the case in which the user ID is input through the keypad input unit, and the case in which the user ID is input through voice will be described later.

The random digit generator 240 generates a continuous, random length digit string in response to a request by the system. Here, the term "continuous" in the continuous, random length digit string means that, for example, a digit string "3456" is not recognized as "three, four, five, six" but as "three thousands four hundred fifty-six". In contrast, a discontinuous digit string only includes monotonously repeated simple pronunciations of ten digits, that is, "zero, one, two, three, four, five, six, seven, eight and nine". However, in addition to the above simple pronunciation of ten numbers, a continuous digit string includes pronunciations of names of decimal places, such as "hundred", "thousand" and "million", and pronunciations of various numbers from 10 to 99. In this case, zero is not uttered. Since the phonetic content of continuous digit strings has more complexity than that of noncontinuous digit strings, the extraction of features of voice is facilitated. The phrase "random length" means that the number of digits in a digit string is not fixed. In other words, a digit string may be one figure, two figures, three figures or other arbitrary figures.

In the embodiment of the present invention using such "continuous", "random length" digit string, randomness can be increased while a simple digit string is used, thereby efficiently defending against voice falsification or voice misappropriation. The random digit generator 240 generates a long digit string of arbitrary digits and divides the long digit string into a plurality of digit strings of arbitrary digits so that each divided digit string can be used as a unit of continuous, random length digits for voice verification. For example, the random digit generator 240 generates a digit string of twenty figures, "12345678901234567890" and divides the digit string into a plurality of unit digit strings, "123", "4567", "890", "12", "345", "6", and "7890", which are to be used as test units. It is obvious to those skilled in the art that each unit digit string can be generated randomly and directly in each test step without generating a long digit string.

A continuous, random length unit digit string, which is generated by the random digit generator 240, is provided in the form of voice and/or characters through the user interface 100, and a user is requested to utter the unit continuous digit string. The user's voice is input through the user interface 100 and passed to the feature extractor 210. The feature extractor 210 extracts voice features from the input user's voice. A linear predictive coding (LPC) method may be used as a method for extracting features from voice. Various voice features extracted by the feature extractor 210 are used in the digit voice verification unit 220 and the speaker verification unit 230.

The digit voice verification unit 220 includes a speaker-independent continuous digit voice model 222 and a digit matching unit 224. The speaker-independent continuous digit voice model 222 is a voice information database which is prepared for recognizing a decimal number corresponding to a continuous digit voice, which is uttered by a user, based on only phonetic values of the voice uttered by the user, independently from unique voice features of individual users ("speaker-independent"). The digit matching unit 224 compares the user's voice features, which are extracted by the feature extractor 210, with each item in the speaker-independent continuous digit voice model 222 to match the user's voice to the continuous, random length digit voice in the speaker-independent continuous digit voice model 222. If continuous digits, which correspond to the matched continuous digit voice, are not identical to continuous digits, which the user is requested to utter by the system, the user is requested to utter the continuous digits again. When discordance between the continuous digits repeatedly occurs, the user's service request may be rejected. In this case, various types of complementary procedures can be anticipated by those skilled in the art.

If the digit voice verification is completed, the speaker verification unit 230 performs a speaker verification procedure. The speaker verification unit 230 includes a speaker model 232, a similarity measuring unit 234, speaker information 236 and a controller 238. The speaker model 232 is a database of phonetic information on voice, which is constructed using various voice features of various phonetic values. The various voice features are extracted from comprehensive learning data. The speaker information 236 is information on voice features of an individual user who is registered in the speaker verification server 200. The speaker information 236 is constructed with reference to the speaker model 232. Instead of separately constructing the speaker model 232 and the speaker information 236, the speaker model 232 and the speaker information 236 can be combined and constructed in an integrated structure by those skilled in the art.

The similarity measuring unit 234 measures the similarity between the user's voice features extracted by the feature extractor 210 and the speaker model 232 with reference to the speaker information 236 of the user. Based on the results of repeated similarity measurement using a plurality of continuous, random length unit digit strings, the controller 238 performs a speaker authentication procedure for determining whether to approve or reject the user. If it is determined that the user is approved, the speaker information 236 of the user is complemented by the user's voice features extracted by the feature extractor 210 and reconstructed. Through this updating, more accurate speaker information 236 can be provided.

The controller 238 provides a mechanism for determining whether the user's voice is misappropriated by means of a machine such as a recorder, using deviation of similarities. The mechanism will be described in more detail with reference to FIG. 3B, later. The controller 238 also performs overall control over the system. For example, when the digit matching unit 224 determines that continuous digits uttered by a user are different from continuous digits requested by the system, a subsequent procedure progresses according to a control signal of the controller 238.

The above description has been set forth focusing on a case in which a user ID is input by means of a keypad in an initial stage of the security check. In a modified operation method of the embodiment of the present invention, a user ID may be input by means of voice. The modified operation method includes an additional step of providing a digit string, which is matched with the voice of the user in the digit matching unit 224, to the user through the user interface 100 under the control of the controller 238, so as to allow the user to confirm. The speaker verification unit 230 may utilize the user's ID voice, which is input by the user, as a continuous, random length unit digit voice.

The operation of the embodiment of the present invention is based on tests of the voice of a user uttering continuous, random length digit strings. Repetition of the test is for obtaining sufficient information necessary for determination of the voice features of a user. It will be understood by those skilled in the art that the embodiment of the present invention can be accomplished by only a single test in another case.

Figure 3A:
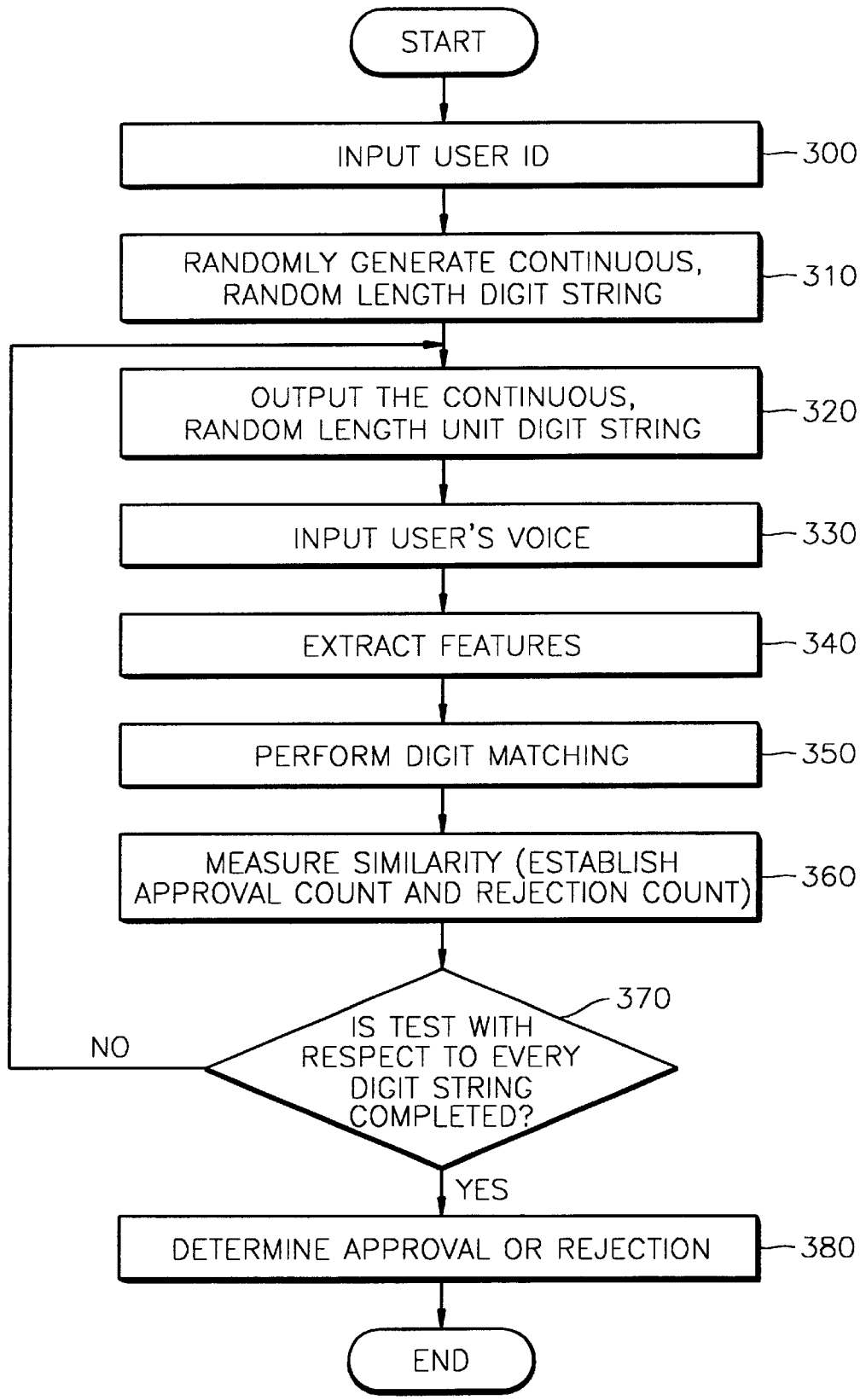
FIG. 3A is a flowchart of speaker verification procedure using the voice of a user uttering a continuous, random length digit string according to an embodiment of the present invention.

The speaker verification system according to the embodiment of the present invention has been described. A speaker verification method of an embodiment of the present invention will now be described. FIG. 3A is a flowchart of speaker verification procedure using the voice of a user uttering a continuous, random length digit string according to the embodiment of the present invention.

A user, who wants to use a particular service, inputs his/her ID to a system by means of voice or an input unit such as a keypad in step 300. A case, in which a user ID is input by means of voice, additionally includes a step in which the system provides a digit string obtained from the user voice using a method like digit matching step 350, which will be described below, to the user so that the user can confirm the digit string, as described in connection with FIG. 2. The input voice of the user uttering the user ID may be utilized as one of the continuous, random length unit digit voice. The following description is focused on the case in which the user ID is input by means of a keypad.

Once the user requests service, the system generates a long digit string with an arbitrary number of figures for using security inspection and divides the long digit string into a plurality of continuous, random length unit digit strings in step 310. Each continuous, random length unit digit string is used in each repeated test step. It has been described that each continuous, random length unit digit string can be directly generated in each test step without generating a long digit string.

Next, the system outputs a continuous, random length unit digit string to the user in the form of voice or characters and requests the user to input the continuous, random length unit digit string by means of voice in step 320. The user then utters the continuous, random length unit digit string and the uttered user's voice is input into the system in step 330.

Once the user's voice is input, the system extracts voice features of continuous, random length digit voice from the user in step 340. The user's voice features extracted in the step 340 are compared with items in the speaker-independent continuous digit voice model to match the user's voice to the continuous, random length digit voice in the speaker-independent continuous digit voice model, and it is determined whether a digit string corresponding to the matched digit voice are identical to the digit string provided to the user in the step 320, in step 350. If the two digit strings are different, the complementary procedure described before will progress.

If the digit string provided to the user in the step 320 is identical to the input digit string which is uttered by the user, the system measures the similarity between the user's voice features extracted in the step 340 and a speaker model with reference to speaker information in step 360. Here, the term "similarity" means the difference between phonetic values of two voices. For repetitive determination of similarities using a plurality of continuous, random length unit digit voices, three variables, that is, a speaker approval count and first and second speaker rejection counts are defined. Two constants, that is, a minimum threshold of a permitted limit of the difference between phonetic values (hereinafter, referred to as a lower similarity threshold or TH1) and a maximum threshold of the permitted limit of the difference between phonetic values (hereinafter, referred to as an upper similarity threshold or TH2) are also defined. If a measured similarity is smaller than TH1, the system increases the speaker approval count, and, if not, the system increases the first speaker rejection count. If a measured similarity exceeds TH2, the system also increases the second speaker rejection count.

Subsequently, the steps 320 through 360 are repeated with respect to other continuous, random length unit digit strings, which have already been generated in the step 310, in step 370. Alternately, instead of generating every continuous, random length unit digit string simultaneously in the step 310, in a case in which a new continuous, random length unit digit string is generated in the step 310 at every test, the steps 310 through 360 are to be repeated.

With reference to a result of the similarity measurement repeatedly performed in the step 360, speaker authentication procedure is performed to finally determine approval or rejection of the user in step 380. In this embodiment of the present invention, repetition of tests is presumed, but approval or rejection can be determined by only one test if sufficient information necessary for determining the user's voice features can be obtained, as mentioned before.

The detailed steps of the user approval/rejection determination step 380 will be described with reference to FIG. 3B.

Figure 3B:
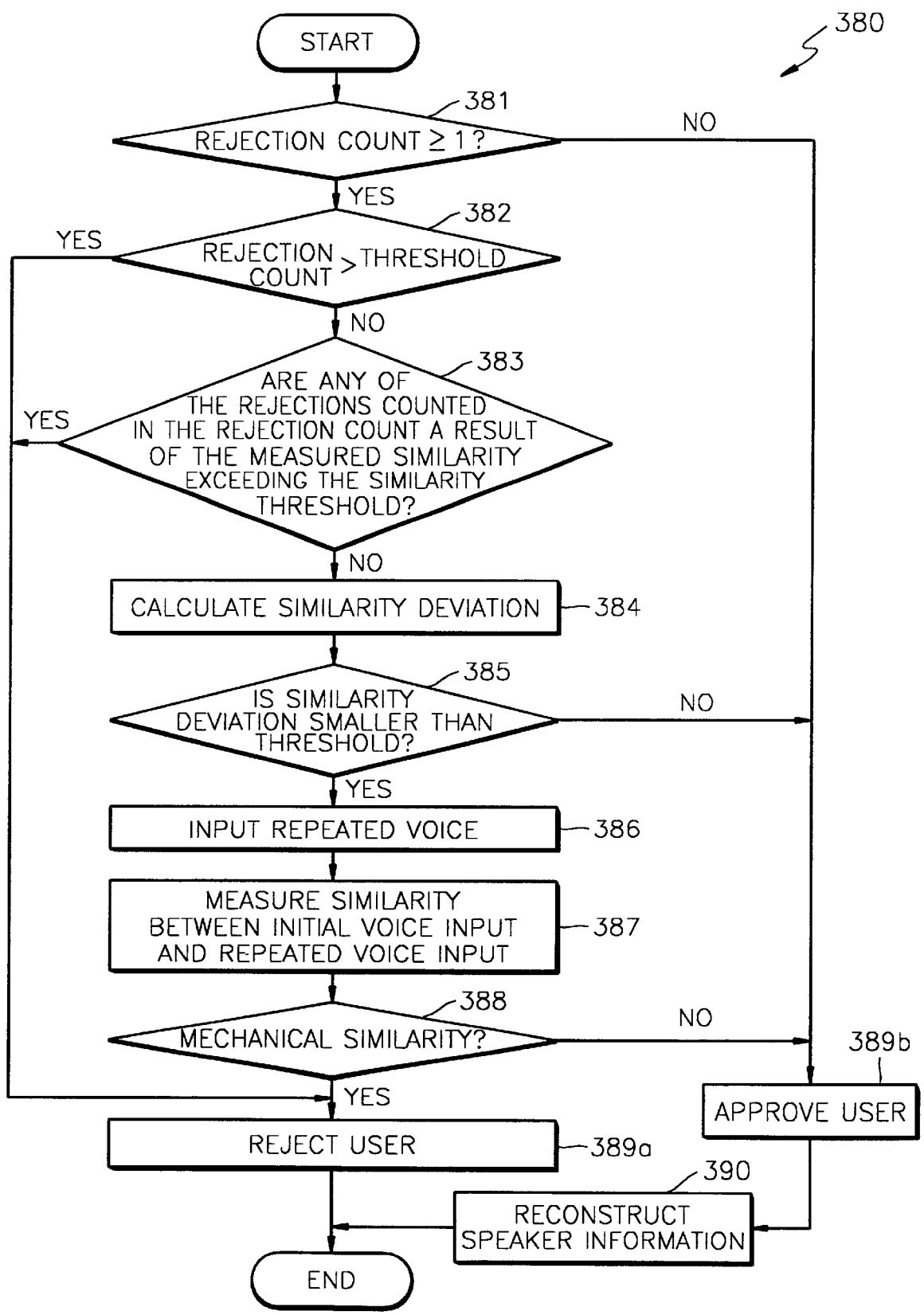
FIG. 3B is a detailed flowchart of an authentication procedure of FIG. 3A according to the embodiment of the present invention.

FIG. 3B is a detailed flowchart of the authentication procedure of FIG. 3A according to the embodiment of the present invention.

For the determination of user approval or rejection, the speaker approval count and the first and second speaker rejection count which are set in the step 360 of FIG. 3A, are used. In addition, a constant, that is, a permitted threshold of the first speaker rejection count (hereinafter, referred to as a rejection count threshold or C1) is defined. If the first speaker rejection count is 0, the user is immediately approved in steps 381 and 389b. If the first speaker rejection count exceeds C1 or the second speaker rejection count is 1 or more, the user is rejected in steps 382, 383 and 389a. It can be understood by those skilled in the art that the order of the steps 381 through 383 can be changed.

As a result of determining the similarity measured in the step 360, if the second speaker rejection count is 0 and the first speaker rejection count is 1 or more but smaller than or equal to the rejection count threshold, a procedure for determining whether the user's voice is misappropriated by means of a machine such as a recorder, is performed using similarity deviation obtained in step 384.

In the step 384, deviation of each similarity, which is measured in the step 360, is calculated and a constant, that is, a threshold of the similarity deviation (hereinafter, referred to as a similarity deviation threshold or TH3) is defined. The similarity deviation threshold is a reference value used in determining misappropriation by means of a machine. If the deviation calculated in the step 384 is equal to TH3 or larger than TH3, the user is approved in steps 385 and 389b, and, if not, a final test procedure is performed starting from step 386 to finally determine whether the user's voice is misappropriated by means of a machine.

If the deviation calculated in the step 384 is smaller than TH3, the system requests the user to repeat the continuous, random length digit string which was input before by the user and receives the user's voice input in step 386. The system measures the pattern similarity between the features of the user's voice, which was input before, and the features of the user's voice, which is repeated, in step 387, and defines a constant, that is, a threshold of the pattern similarity (hereinafter, referred to as a mechanical voice similarity or TH4). The threshold of the pattern similarity is used as a reference value when finally determining that the input voice is misappropriated by means of a machine. If the pattern similarity measured in the step 387 is smaller than TH4, the input user's voice is considered as repetition by the machine and the system finally rejects the user, and, if not, the system finally approves the user in steps 388, 389a and 389b.

For the convenience of description, various thresholds TH1, TH2, TH3, TH4 and C1 and count variables are assumed to be defined in corresponding steps, respectively. However, it will be understood by those skilled in the art that the various thresholds can be defined during initialization of the system. It will be also understood that the definition of each threshold may not be repeated but be performed only once.

After the approval of the user is determined in the step 389b, the system finally reconstructs the speaker information of the user using voice information data, which has been collected during the repeated test steps, in step 390.

The speaker verification method using continuous, random length digit voice according to an embodiment of the present invention, has been described. The following description concerns speaker registration procedure according to an embodiment of the present invention.

Figure 4:
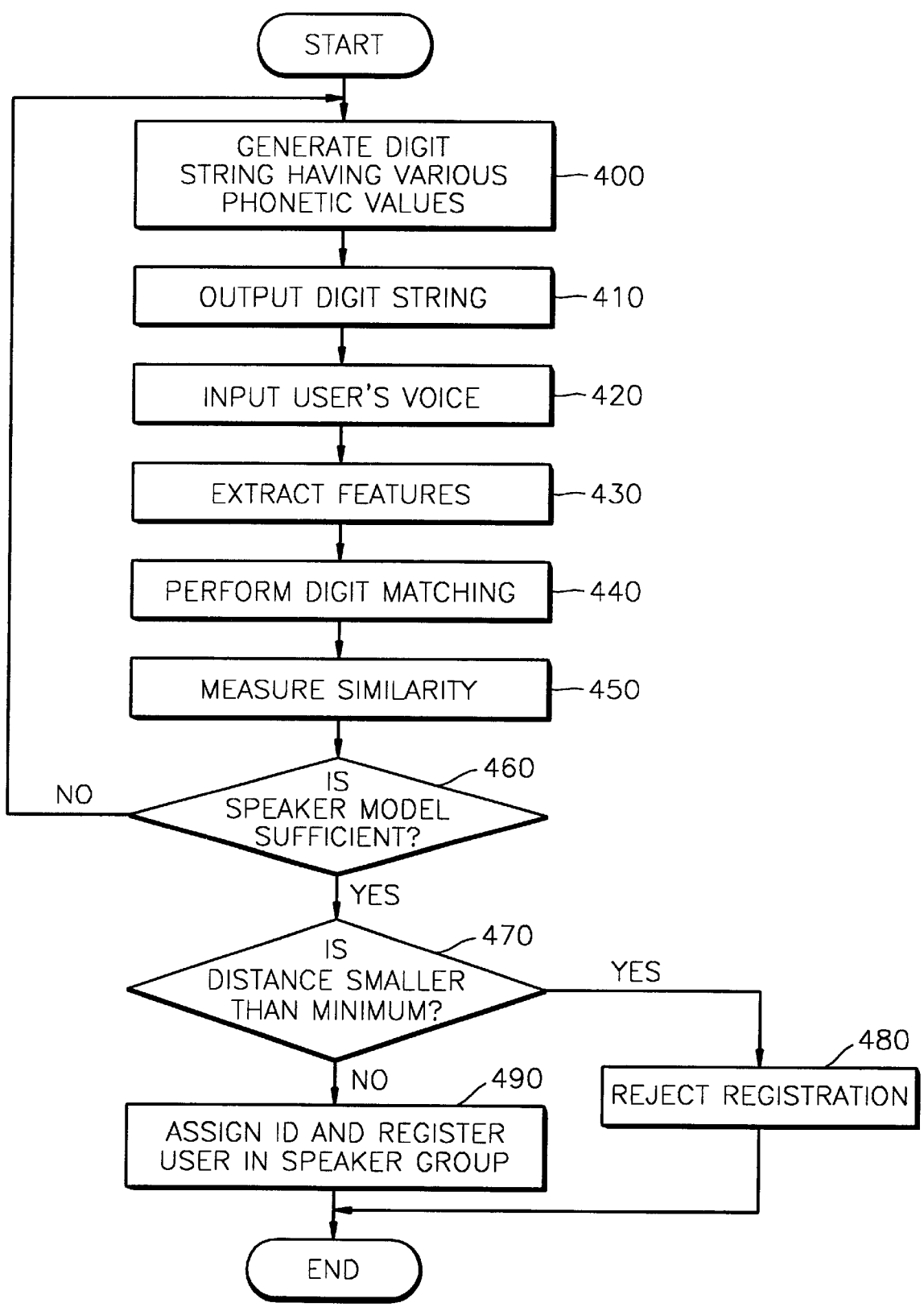
FIG. 4 is a flowchart of a speaker registration procedure in a speaker verification system according to an embodiment of the present invention.

FIG. 4 is a flowchart of the speaker registration procedure in a speaker verification system according to an embodiment of the present invention. Once a user requests the use of a particular service for the first time, the system performs the speaker registration procedure. Primarily, the system generates a continuous digit string having a minium number of digits which are necessary for measuring various phonetic values in step 400. The system generates digits having phonetic values having high discrimination among speakers are generated in the step 400. Then, the system provides the generated continuous digit string to the user in the form of voice or characters and requests the user to input the continuous digit string by means of voice in step 410. If the user utters the provided continuous digit strings, the uttered voice of the user is input to the system in step 420.

Once the user's voice is input to the system, the system extracts voice features from the user's voice input in step 430. Subsequently, the system compares the user's voice features extracted in the step 430 with a speaker-independent continuous digit voice model to match the user's voice to a continuous digit voice and determines whether a digit string recognized through the matching is identical to the digit string which is provided to the user in the step 410, in step 440. If the two digit strings are different, complementary measures similar to those in the speaker verification method are taken.

If the digit string provided to the user in the step 410 is identical to the digit string recognized from the user's voice input, the user's voice features extracted in the step 430 are compared with the speaker model with reference to a speaker information of each user, who has already been registered, to measure a similarity in step 450.

The steps 400 through 450 are repeated until a sufficient speaker model of the user is obtained in step 460. The term "sufficient" implies that the user's voice features are collected enough to identify the user so that, when the user inputs his/her voice later, the user can be identified by the collected features of his/her own in spite of other sounds such as noise which can be input during the voice input step. It will be understood by those skilled in the art that a sufficient speaker model can be constructed by inputting a user's voice only once in particular application fields using sophisticated systems. Moreover, it will also be easily understood that the step 400 cannot be performed every repetition of the procedure if the system generates a plurality of digit strings in the initial stage and uses each of the digit strings at each repeated procedure. In this case, the steps 410 through 450 are repeated.

When the construction of the sufficient speaker model is completed, the system checks the possibility of registration of the user in step 470. For this operation, a constant, that is, a minimum distance threshold for allowing registration (hereinafter, referred to as TH5) is previously defined. A speaker model of the user is compared with the speaker model with reference to the speaker information of the other users who have already been registered to obtain a distance therebetween. If it is determined that the distance between the current user's speaker model and the registered users' speaker model is smaller than TH5, the registration of the current user is rejected in steps 470 and 480. If not, the registration of the current user is approved. TH5 can be differently defined in different application fields or operating environments of different systems. It will be anticipated from the above description that TH5 may be defined in the initializing stage of the system and the definition of TH5 is performed only once.

When the registration of the current user is approved, a unique ID is assigned to the user, and the current user is registered in speaker information with reference to the speaker model and is registered as a member of a group of users who have already been registered in step 490.

The embodiments of the present invention can be made into programs which can be executed in a computer system. The programs can be read from a computer-readable medium and executed by a general purpose digital computer system. The computer-readable medium covers storage mediums such as a magnetic storage medium (e.g., ROM, a floppy disk or a hard disk), an optical readable medium (e.g., CD-ROM or DVD) or carrier waves (e.g., transmission through internet).

As described above, the present invention randomly generates continuous, random length digits and uses similarity deviation, thereby removing the possibility of voice misappropriation. In addition, the present invention uses continuous, random length digits, thereby maintaining a database managed for speaker verification at a relatively small size. The present invention also reconstructs speaker information whenever approval is determined for each user, thereby keeping more accurate speaker information.

The scope of the invention being set forth in the following claims. While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A speaker verification system for verifying a user by the voice of the user uttering a continuous, random length digit string, the speaker verification system comprising:

a random digit generator for generating a continuous, random length digit string;

a user interface for providing the continuous, random length digit string, which is generated by the random digit generator, to the user and receiving the voice of the user uttering the provided continuous, random length digit string;

a feature extractor for extracting voice features from the user's voice which is received via the user interface;

a digit voice verification unit for comparing the voice features, which are extracted by the feature extractor, with items in a speaker-independent continuous digit voice model to derive a digit string corresponding to items in the speaker-independent continuous digit voice model, which match the voice features, and for determining whether the derived digit string is identical to the digit string, which has been provided to the user via the user interface; and a speaker verification unit for comparing the voice features, which are extracted by the feature extractor, with a speaker-dependent model of the user to measure the similarity between them, the speaker-dependent model of the user including previously determined features of the users' voice, and for determining whether to approve or reject the user based on the similarity, when it is determined that the derived digit string is identical to the digit string which has been provided to the user.

2. The speaker verification system of claim 1, wherein the speaker verification unit comprises:

a similarity measuring unit for comparing the voice features, which are extracted by the feature extractor, with the speaker-dependent model of the user to measure the similarity between them, when it is determined that the derived digit string is identical to the digit string which has been provided to the user; and a controller for determining whether to approve or reject the user based on the similarity which is measured by the similarity measuring unit and for constructing the speaker information of the user in the speaker-dependent model using the voice features, which are extracted by the feature extractor, when it is determined to approve the user.

3. The speaker verification system of claim 1, wherein the verification unit comprises:

a similarity measuring unit for comparing the voice features, which are extracted by the feature extractor, with the speaker-dependent model of the user to measure the similarity between them, when it is determined that the derived digit string is identical to the digit string which has been provided to the user; and a controller for determining whether the user's voice is misappropriated using similarity deviation, while determining whether to approve or reject the user based on the similarity measured by the similarity measuring unit.

4. A speaker verification method for verifying a user by the voice of a user uttering a continuous, random length digit voice, the speaker verification method comprising the steps of:

(a) randomly generating a continuous, random length digit string;

(b) providing the continuous, random length digit string to the user;

(c) receiving the voice of the user uttering the continuous, random length digit string;

(d) extracting voice features from the received user's voice;

(e) comparing the extracted voice features with items in a speaker-independent continuous digit voice model to derive a digit string corresponding to items in the speaker-independent continuous digit voice model, which match the voice features, and determining whether the derived digit string is identical to the digit string provided to the user in the step (b); and (f) comparing the voice features extracted in the step (d), with a speaker-dependent model of the user and determining whether to approve or reject the user.

5. The speaker verification method of claim 4, wherein the step (f) comprises the step of reconstructing the speaker information of the user in the speaker-dependent model using the voice features which are extracted in the step (d), when determining to approve the user.

6. A speaker verification method using continuous, random length digit voice, the speaker verification method comprising the steps of:

(a) providing a continuous, random length digit string, which is randomly generated, to a user;

(b) receiving the voice of the user uttering the continuous, random length digit string and extracting voice features from the received user's voice;

(c) comparing the extracted voice features with items in a speaker-independent continuous digit voice model to derive a digit string corresponding to items in the speaker-independent continuous digit voice model, which are matched with the voice features, and determining whether the derived digit string is identical to the digit string, which has been provided to the user in the step (a);

(d) comparing the voice features, which has been extracted in the step (c), with speaker model of the user and measuring the similarity between the voice features and the speaker model of the user, the similarity indicating the difference between phonetic values;

(e) increasing a first speaker rejection count when the similarity, which is measured in the step (d), is greater than or equal to a predetermined lower similarity threshold and increasing a second speaker rejection count when the similarity is greater than or equal to a predetermined upper similarity threshold; and (f) after repeating the steps (a) through (e) a plurality of times, (f1) approving the user when the first speaker rejection count is 0, and rejecting the user when the second speaker rejection count is at least 1 or the first speaker rejection count exceeds a predetermined rejection count threshold; and (f2) determining whether to approve or reject the user based on the similarity measured in the step (d), when the second speaker rejection count is 0, and the first speaker rejection count is at least 1 and less than or equal to the rejection count threshold.

7. The speaker verification method of claim 6, wherein the step (f) further comprises the step of reconstructing the speaker information of the user in the speaker-dependent model using the voice features extracted in the step (d), when it is determined that the user is approved.

8. The speaker verification method of claim 6, wherein the step (f2) comprises the steps of:

(f21) calculating deviation of the similarity measured in the step (d) when the second speaker rejection count is 0, and the first speaker rejection count is at least 1 and less than or equal to the rejection count threshold; and (f22) approving the user when the deviation of the similarity is greater than or equal to a predetermined similarity deviation threshold, and determining whether to approve or reject the user after verifying whether the user's voice is misappropriated when the deviation of the similarity is smaller than the similarity deviation threshold.

9. The speaker verification method of claim 8, wherein the step (f22) comprises the steps of:

(f221) approving the user when the deviation of the similarity is greater than or equal to the predetermined similarity deviation threshold, and requesting the user to repeat uttering of the continuous, random length digit string, which has already been input, and receiving the voice of the user uttering the digit string when the deviation of the similarity is smaller than the predetermined similarity deviation threshold;

(f222) measuring similarity between the features of the user's voice, which is previously input, with features of the user's voice, which is input later; and (f223) rejecting the user when the similarity, which is measured in the step (f222), is smaller than a predetermined mechanical sound similarity threshold, and approving the user when the similarity, which is measured in the step (f222), is greater than or equal to the predetermined mechanical sound similarity threshold.

10. The speaker verification method of claim 9, further comprising the step of reconstructing the speaker information of the user in the speaker-dependent model using the voice features extracted in the step (b), when it is determined that the user is approved.

11. A speaker registration method in a speaker verification system, the speaker registration method comprising the steps of:

(a) providing a continuous digit string having various phonetic values to a user;

(b) receiving the voice of the user uttering the continuous digit string;

(c) extracting voice features from the received user's voice;

(d) comparing the extracted voice features with items in a speaker-independent continuous digit voice model to derive a digit string corresponding to items in the speaker-independent continuous digit voice model, which match the voice features, and determining whether the derived digit string is identical to the digit string provided to the user in the step (a);

(e) comparing the voice features extracted in the step (c), with speaker-dependent model of the user and measuring the similarity between the voice features and the speaker dependent model of the user; and (f) determining whether to register the user based on the measured similarity.

12. The speaker registration method of claim 11, wherein the steps (a) through (e) are repeated until a sufficient model of the user is constructed.

13. A computer-readable recording medium for recording a program which is executed in a computer for speaker verification for verifying a user by the voice of the user uttering continuous, random length digit string, wherein the program comprises the steps of:

(a) randomly generating a continuous, random length digit string;

(b) providing the continuous, random length digit string to the user;

(c) receiving the voice of the user uttering the continuous, random length digit string;

(d) extracting voice features from the received user's voice;

(e) comparing the extracted voice features with items in a speaker-independent continuous digit voice model to derive a digit string corresponding to items in the speaker-independent continuous digit voice model, which match the voice features, and determining whether the derived digit string is identical to the digit string provided to the user in the step (b); and (f) comparing the voice features extracted in the step (d), with a speaker-dependent model of the user and determining whether to approve or reject the user.

14. A computer-readable recording medium for recording a program which is executed in a computer for speaker verification for verifying a user by the voice of the user uttering continuous, random length digit string, wherein the program comprises the steps of:

(a) providing a continuous, random length digit string, which is randomly generated, to a user;

(b) receiving the voice of the user uttering the continuous, random length digit string and extracting voice features from the received user's voice;

(c) comparing the extracted voice features with items in a speaker-independent continuous digit voice model to derive a digit string corresponding to items in the speaker-independent continuous digit voice model, which are matched with the voice features, and determining whether the derived digit string is identical to the digit string, which has been provided to the user in the step (a);

(d) comparing the voice features, which has been extracted in the step (c), with speaker model of the user and measuring the similarity between the voice features and the speaker model of the user, the similarity indicating the difference between phonetic values;

(e) increasing a first speaker rejection count when the similarity, which is measured in the step (d), is greater than or equal to a predetermined lower similarity threshold and increasing a second speaker rejection count when the similarity is greater than or equal to a predetermined upper similarity threshold; and (f) after repeating the steps (a) through (e) a plurality of times,
- (f1) approving the user when the first speaker rejection count is 0, and rejecting the user when the second speaker rejection count is at least 1 or the first speaker rejection count exceeds a predetermined rejection count threshold; and
- (f2) determining whether to approve or reject the user based on the similarity measured in the step (d), when the second speaker rejection count is 0, and the first speaker rejection count is at least 1 and less than or equal to the rejection count threshold.

15. A computer-readable recording medium for recording a program which is executed in a computer for speaker registration in a speaker verification system, wherein the program comprises the steps of:

(a) providing a continuous digit string having various phonetic values to a user;

(b) receiving the voice of the user uttering the continuous digit string;

(c) extracting voice features from the received user's voice;

(d) comparing the extracted voice features with items in a speaker-independent continuous digit voice model to derive a digit string corresponding to items in the speaker-independent continuous digit voice model, which match the voice features, and determining whether the derived digit string is identical to the digit string provided to the user in the step (a);

(e) comparing the voice features extracted in the step (c), with speaker-dependent model of the user and measuring the similarity between the voice features and the speaker dependent model of the user; and (f) determining whether to register the user based on the measured similarity.

* * * * *